(12) United States Patent
Klotz et al.

(10) Patent No.: US 6,517,614 B1
(45) Date of Patent: Feb. 11, 2003

(54) PLASTIC HOLLOW STRUCTURE

(75) Inventors: Arthur Klotz, Remseck (DE); Stephan Mengele, Hoechstadt (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/403,544

(22) PCT Filed: Feb. 18, 1998

(86) PCT No.: PCT/EP98/00923
§ 371 (c)(1),
(2), (4) Date: Feb. 1, 2000

(87) PCT Pub. No.: WO98/47690
PCT Pub. Date: Oct. 29, 1998

(30) Foreign Application Priority Data

Apr. 24, 1997 (DE) .......................................... 197 17 196

(51) Int. Cl.[7] .............................................. B01D 46/00
(52) U.S. Cl. ........................... 96/384; 96/380; 55/385.3; 55/502
(58) Field of Search .......................... 96/380, 384, 385, 96/386, 388; 55/385.3, DIG. 5, DIG. 21, DIG. 28, 502; 123/184.21, 184.24, 184.42, 184.47, 184.61, 198 E; 156/73.5, 73.1

(56) References Cited

U.S. PATENT DOCUMENTS

| | | | | |
|---|---|---|---|---|
| 2,906,370 A | * | 9/1959 | McMullen et al. | ............ 96/380 |
| 3,002,870 A | * | 10/1961 | Belgarde et al. | ............ 156/73.5 |
| 3,849,093 A | * | 11/1974 | Konishi et al. | ......... 55/DIG. 28 |
| 3,932,153 A | * | 1/1976 | Byrns | ........................... 55/511 |
| 4,601,768 A | * | 7/1986 | Bouyoucos et al. | ....... 156/73.5 |
| 4,685,472 A | * | 8/1987 | Muto | ......................... 210/446 |
| 4,919,987 A | * | 4/1990 | Manner | ...................... 156/73.5 |
| 4,930,472 A | * | 6/1990 | Ozaki | ..................... 123/198 E |
| 4,997,500 A | * | 3/1991 | Arnett et al. | .............. 156/73.5 |
| 5,290,445 A | * | 3/1994 | Buttery | ................... 55/DIG. 5 |
| 5,342,268 A | * | 8/1994 | Caruthers | .................... 482/106 |
| 5,391,212 A | * | 2/1995 | Ernst et al. | ................. 55/385.3 |
| 5,492,089 A | * | 2/1996 | Hiraoka et al. | ........ 123/184.47 |
| 5,501,723 A | * | 3/1996 | Andress et al. | ................ 96/131 |
| 5,503,662 A | * | 4/1996 | Berger | .......................... 96/108 |
| 5,575,247 A | * | 11/1996 | Nakayama et al. | .... 123/184.21 |
| 5,575,249 A | * | 11/1996 | Mielke et al. | ......... 123/184.61 |
| 5,642,697 A | * | 7/1997 | Jahrens et al. | ......... 123/184.21 |
| 5,857,224 A | * | 1/1999 | Oberg et al. | ................ 220/4.12 |
| 5,899,378 A | * | 5/1999 | Hainle et al. | .............. 156/73.5 |
| 6,123,216 A | * | 9/2000 | Yokocho et al. | ........... 220/4.14 |
| 6,167,862 B1 | * | 1/2001 | Powell et al. | ........... 123/198 E |

FOREIGN PATENT DOCUMENTS

GB  2 226 711  7/1990

OTHER PUBLICATIONS

Schwarz et al., "Kunststoffverarbeitung" (Plastic Processing), pp. 198–203.

* cited by examiner

*Primary Examiner*—Duane Smith
*Assistant Examiner*—Jason M. Greene
(74) *Attorney, Agent, or Firm*—Crowell & Moring LLP

(57) ABSTRACT

A multi-component hollow structure including at least two synthetic resin housing parts (1, 3) with corresponding sealing surfaces (2, 4), and at least one half wall per housing part, in which the half walls of one housing part meet corresponding half walls of the other housing part in order to reinforce the hollow structure, and in which the corresponding sealing surfaces (2, 4) and the half walls (6, 7) are joined using a friction force, such as vibration welding or ultrasonic welding. A method for producing such multi-component hollow structures is also disclosed.

10 Claims, 4 Drawing Sheets

PLASTIC HOLLOW STRUCTURE

BACKGROUND OF THE INVENTION

The invention relates to a method for producing assembled synthetic resin structures with hollow chambers.

The invention furthermore relates to an assembled structure with a hollow chamber.

Such a method, and the corresponding hollow chamber structure, are disclosed in GB 22 26 711. If it is desired to use such a hollow structure in areas in which the structure is to be gas-tight with respect to the environment, it is disadvantageous that such a structure tends to be leaky. To seal such a hollow structure after manufacture, for example with additional elastomer seals, is, however, expensive and the hollow structure would therefore be more expensive. Furthermore, the insertion of floors into containers by friction welding is disclosed in Swarz, O., Kunststoffverarbeitung (Plastic Processing), Wurzburg, page 201.

SUMMARY OF THE INVENTION

It is therefore the object of the invention to improve an apparatus of the kind described above so as to create a flexible, safe and inexpensive manufacturing method and a device which is gas-tight, reliable and inexpensive.

This object is achieved in accordance with the invention in that the method for the production of assembled synthetic resin hollow structures from at least two synthetic resin housing parts with matching sealing and wall surfaces for producing an oscillation tube cross section comprises the following steps: providing a first synthetic resin housing part with a first sealing surface and at least a first half wall, providing a second synthetic resin housing part with a second sealing surface and at least one second half wall, disposing the first synthetic resin housing part in a first tool which supports the first synthetic resin housing part in the vicinity of the first sealing surface, disposing the second synthetic resin housing part in a second tool which supports the second synthetic resin housing part in the vicinity of the second sealing surface, arranging the parts with the matching sealing surfaces so that the corresponding sealing surfaces as well as the at least one first half wall of the first synthetic resin housing part and the at least one second half wall of the second synthetic resin housing part come in contact with one another, applying a binding force to all of the sealing surfaces, wherein at least one of the tools is moved relative to the other tool in order thus to produce a friction force to bond together the individual parts. The synthetic resin housing parts are thus bonded by friction or vibration welding. An alternative method for making assembled synthetic resin hollow structures from at least two synthetic resin housing parts with matching sealing surfaces and wall surfaces for producing stable hollow structures comprises the following steps: providing a first synthetic resin housing part with a first sealing surface and at least a first half wall, providing a second synthetic resin housing part with a second sealing surface and at least one second half wall, disposing the first synthetic resin housing part in a first tool which supports the first synthetic resin housing part in the vicinity of the first sealing surface, disposing the second synthetic resin housing part in a second tool which supports the second synthetic resin housing part in the vicinity of the second sealing surface, arranging the parts with the matching sealing surfaces so that the corresponding sealing surfaces as well as the at least one first half wall of the first synthetic resin housing part and the at least one second half wall of the second synthetic resin housing part come in contact with one another, application of bonding force to the entire sealing surfaces, wherein at least one of the tools is moved relative to the other tool in order thus to produce a frictional force to join the individual parts. Thus an assembled hollow structure is formed, which comprises at least two housing parts with matching sealing surfaces and at least one half wall per synthetic resin housing part, wherein the wall halves mate with one another so as to strengthen the hollow structure, and wherein the matching sealing surfaces and the wall halves are bonded by means of the friction force.

An alternative assembled hollow structure is likewise provided, having an inlet and an outlet, which comprises at least two housing parts with matching sealing surfaces and at least one half wall for each synthetic resin housing part, wherein the wall halves match to produce a oscillation tube cross section inside the housing, and the matching sealing surfaces and the wall halves are joined together by friction force and the inlet communicates with the outlet through the oscillation tube cross section.

In a special variant, an air intake filter for an internal combustion engine is formed, with noise damping in front of and/or in back of a filter, wherein a previously described assembled hollow structure is used.

An advantageous embodiment of the invention provides that, in one of the previously described methods, the bonding force is applied by high pressure and/or high frequencies, especially in the ultrasonic range.

In another advantageous embodiment it is provided that the wall halves are arranged substantially transversely to the direction of the welding vibration. On the one hand this makes the hollow structure more stable, and on the other hand it is possible by this measure to produce labyrinth-like chambers having, for example, a sound-damping action.

Also, it can be arranged according to the invention for at least one half wall to have at least one cross rib, which is advantageous especially when a transverse half wall is joined to its matching other half by means of vibration welding as so-called remote welding. The cross rib prevents excessive deflection of the wall halves during vibration welding, which would make welding impossible.

An advantageous embodiment of the invention provides that the half wall of a synthetic resin housing part is a dome-like bulge of the synthetic resin housing wall which extends into the housing interior. This three-dimensional configuration of the housing wall also increases the strength, so that the wall in the area to be welded will not impair the quality of the weld, much less render it impossible, due to excessive deflection.

Advantageous further embodiments are described hereinafter.

These and additional features of preferred embodiments of the invention will be found not only in the claims but also in the description and the drawings, and the individual features can each be realized by itself or together in the form of subcombinations in embodiments of the invention and in other fields, and can constitute advantageous as well as independently patentable embodiments, for which protection is hereby claimed.

DETAILED DESCRIPTION OF PREFERRED EMBODIMENTS

Figure 1:
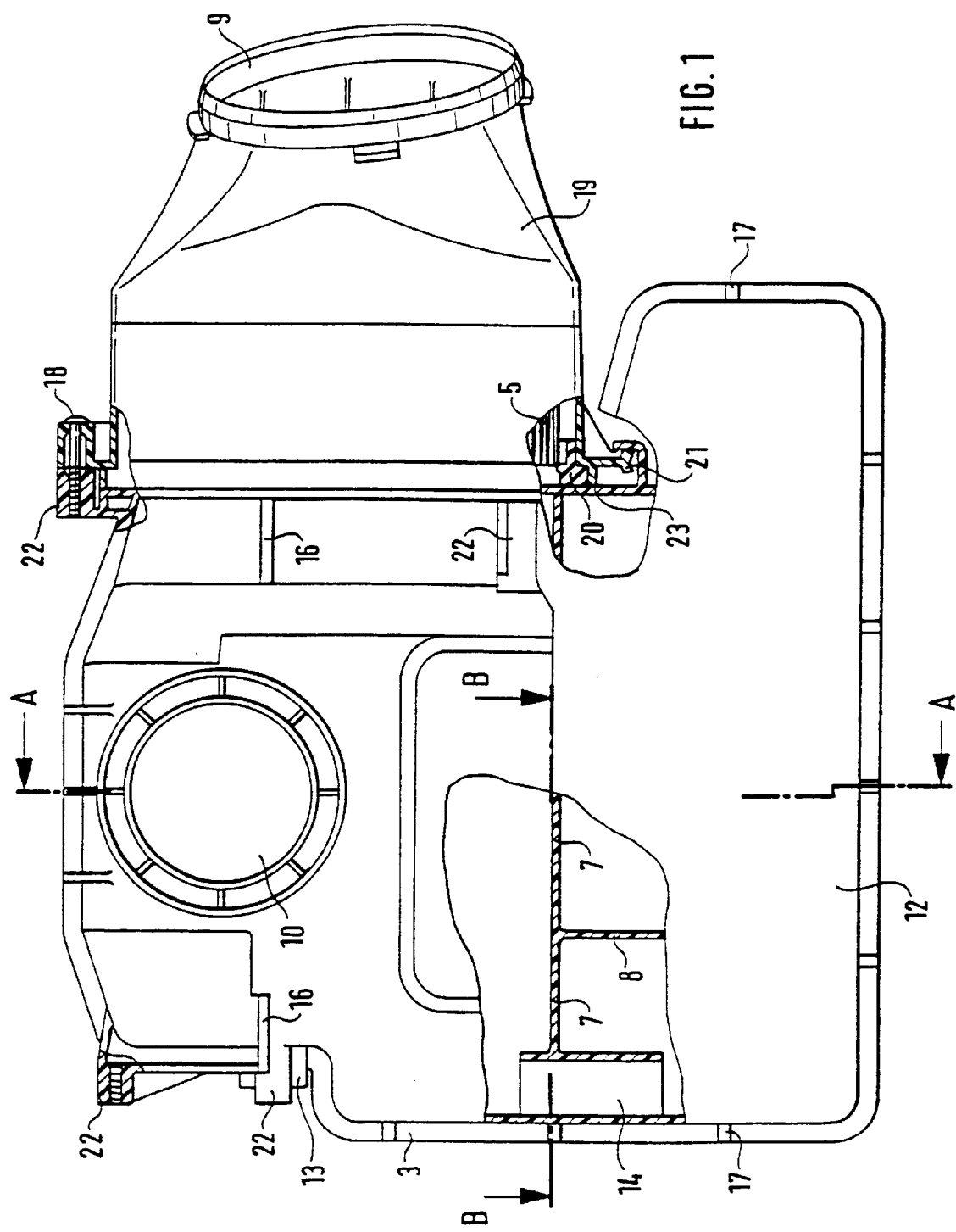
FIG. 1 is a top view of an embodiment.

In FIG. 1 a synthetic resin housing part 3 is illustrated, on the side of which a filter 5 is arranged. This synthetic resin housing part has wall halves 7 together with cross ribs 8 disposed at right angles thereto, which help to stabilize the synthetic resin housing part. The entire synthetic resin hollow structure represented in FIG. 1 has an inlet 9 and an outlet 10 communicating with the inlet. The synthetic resin hollow chamber structure is divided substantially into the resonator chamber 12 and the collecting chamber 13, a filter 5 being disposed ahead of the collecting chamber 13. The resonator chamber 12 communicates through a connecting opening 14 with the collecting chamber 13.

On the synthetic resin housing part 3 there are fastening means 16 by means of which, in conjunction with screws not shown in FIG. 1, the synthetic resin hollow chamber structure, which in the illustrated embodiment serves as a sound-damping air intake filter, [is mounted] for example, in the engine compartment of a motor vehicle (not shown).

To increase the rigidity of the synthetic resin housing, the synthetic resin housing part 3 has so-called vibration welding follower reinforcing ribs 17 which are arranged especially in the area of the second sealing surface, which is not visible in this drawing. By means of the screw 18 the air filter housing 19 is joined to the synthetic resin housing part 3 and the threaded bushing 22 situated at that location. In the installed state, the filter 5 is urged with gasket 20 against the sealing surface 23 of the synthetic resin housing part 3, which [is aided] by the lever-like configuration of the housing mounting 21 of the air filter housing 19 in connection with the threaded bushing 22, which in turn receives the screw 18 situated in the air filter housing 19, the housing around the screw having a diameter that is smaller than the thread diameter of the screw 18, so that a self-securing screw fastening is the result, which has advantages during assembly and disassembly, since the screw 18 requires no additional holding effort.

Figure 2:
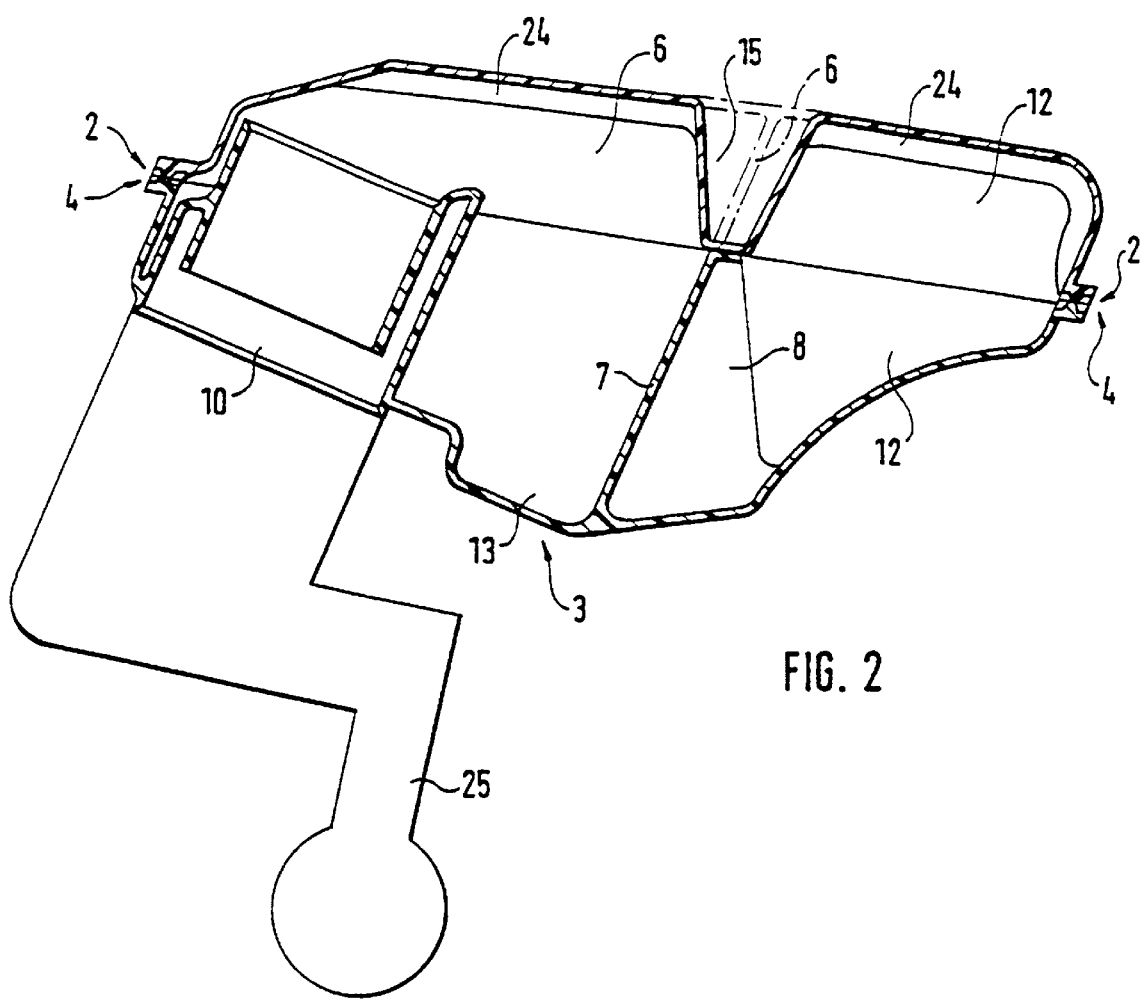
FIG. 2 a section along line A—A

In FIG. 2, a section along line A—A of FIG. 1 is shown. The synthetic resin housing part 1 has a first sealing surface 2 which, with the matching synthetic resin housing part 3 and the sealing surface 4 pertaining thereto, forms the synthetic resin hollow structure. The filter of FIG. 1 is not visible in this figure. The synthetic resin housing half 1 has a half wall 6 which in turn corresponds to the half wall 7 which originates from the synthetic resin housing part 3. In the embodiment shown in FIG. 2, the synthetic resin hollow chamber structure has already been vibration-welded; whereby the cross ribs 8 serve to stabilize the cantilevered wall halves 7 so as to prevent excessive deflections of the wall halves 7, since the vibration welding direction 11 is substantially at right angles to the wall halves. For the same reason the wall halves 6 are joined together in the synthetic resin housing part 3 by dome-like bulges 15 to increase the strength of the housing part. These dome-like bulges likewise permit direct action by the vibration welding tool on the seam surfaces, while the dome area is given a weld which can absorb loads, the weld in the area of the wall halves 6 assumes a sealing function. The outlet 10 is located in the synthetic resin housing part such that there is a spacing relative to the housing wall which is greater than the vibration amplitude, so that during the vibration welding it does not come in contact with the corresponding synthetic resin housing part 1. The outlet 10 is in communication with the air intake tract of the internal combustion engine (not shown), and in turn it communicates with the collecting chamber 13 of the synthetic resin hollow chamber structure, which communicates with the resonator chamber 12. The connection between the collecting chamber 13 and resonator chamber 12 is effected by a connecting opening which is not visible in this figure, such that the resonator chamber 12 acts as a shunt resonator. Reinforcing ribs 24 are disposed in the synthetic resin housing part 1 for the additional stiffening of the housing.

Figure 3:
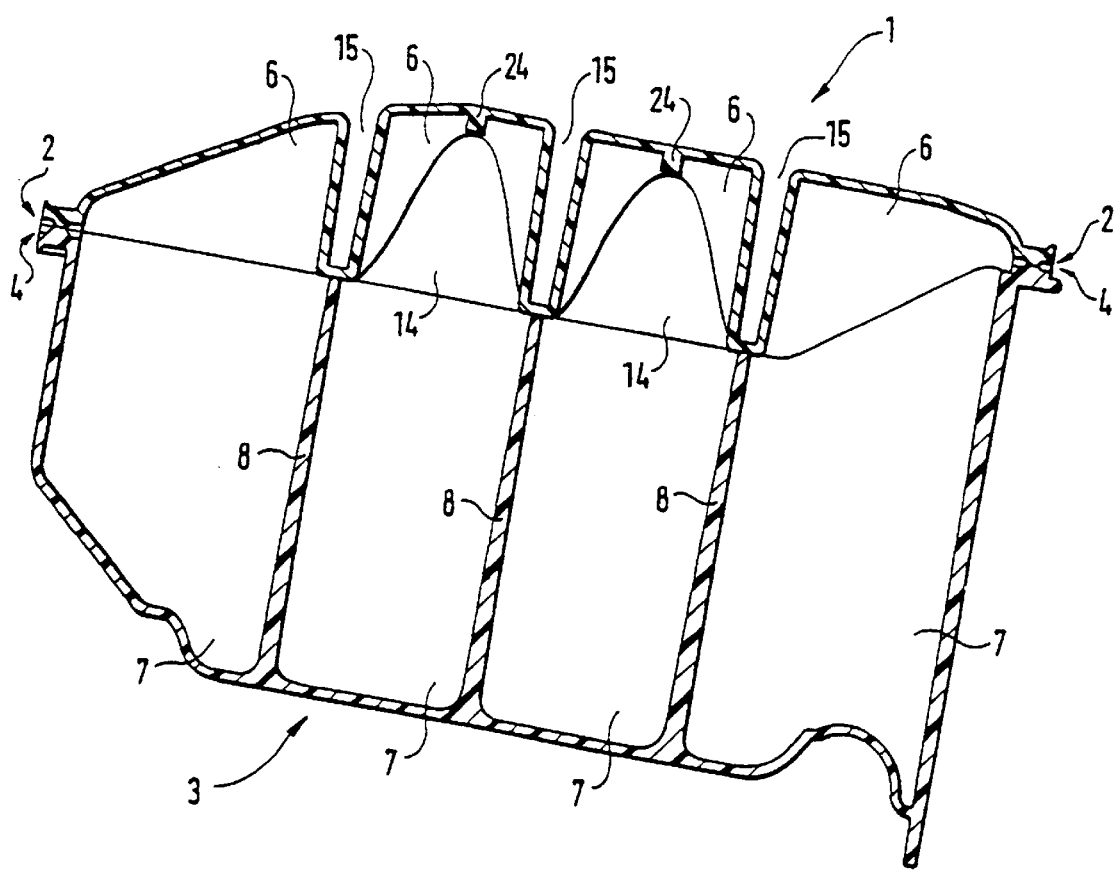
FIG. 3 a view taken along line B—B

FIG. 3 represents a section along line B—B in FIG. 1. The synthetic resin housing part 1 has a first sealing surface 2 which, with the matching synthetic resin housing part 3 and the sealing surface 4 pertaining thereto, forms the synthetic resin hollow chamber structure after vibration welding. The synthetic resin housing half 1 has wall halves 6 which in turn correspond with the wall halves 7 which are fastened in the synthetic resin housing part 3. In the embodiment shown in FIG. 3, the synthetic resin hollow structure is vibration-welded, while the cross ribs 8 illustrated in section serve to stabilize the cantilevered wall halves 7, in order to prevent deflections of the wall halves 7, which would interfere with the welding, since the direction of the vibration welding is substantially at right angles to the wall halves (6, 7). For the same reason, the wall halves 6 are connected together by means of dome-like bulges 15 in the synthetic resin housing part 3 to increase the strength of the housing part. These dome-like bulges make possible the relatively direct action of the vibration welding tool on the seam surfaces. The resonator chamber, not shown here, communicates with the likewise not shown collecting chamber of the synthetic resin hollow structure by means of the connecting opening 14. In the synthetic resin hollow chamber structure, stiffening ribs 24 are arranged, which increase torsional stiffness.

Figure 4:
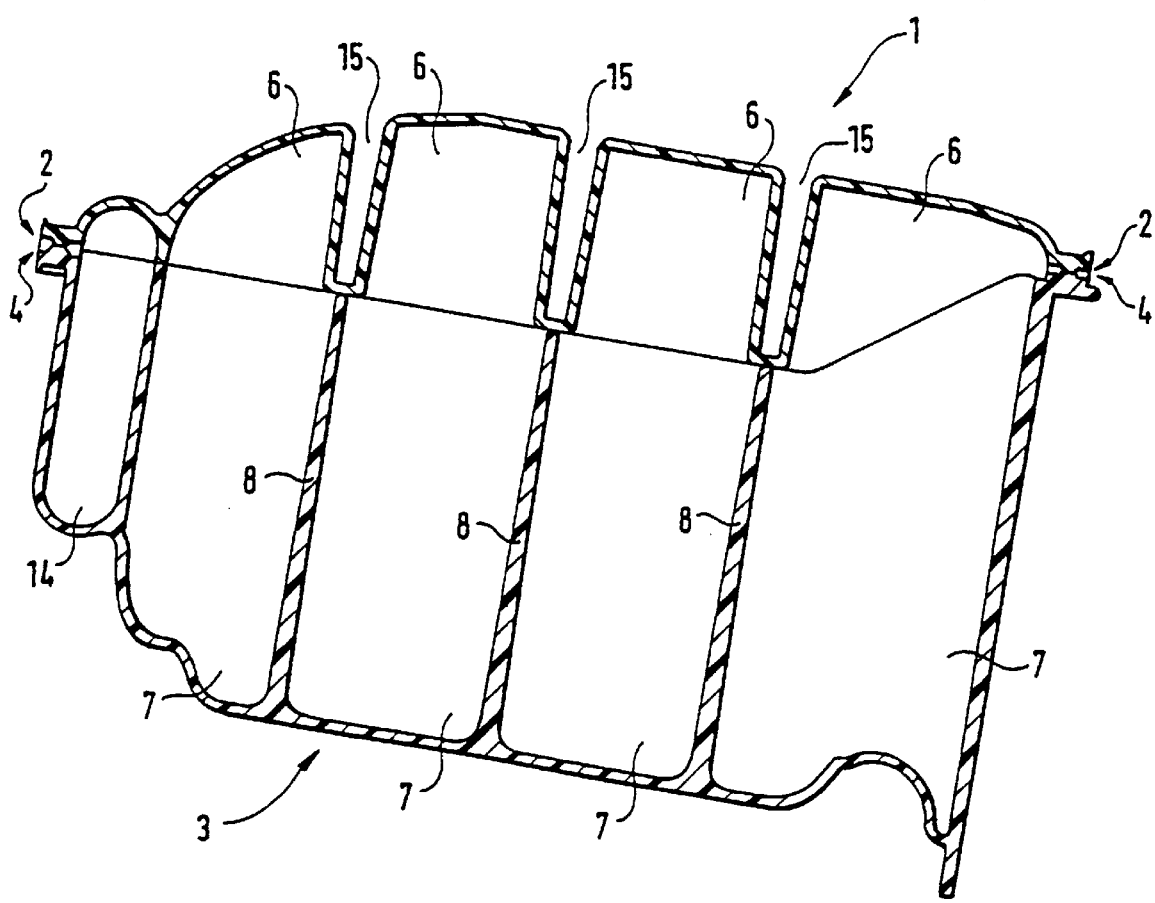
FIG. 4 a view taken along line B—B

In FIG. 4, a section along line B—B of FIG. 1 is shown. The synthetic resin housing part 1 has a first sealing surface 2, which with the corresponding synthetic resin housing part 3 and the corresponding sealing surface 4 forms the synthetic resin hollow chamber structure after the vibration welding. The synthetic resin housing half 1 has wall halves 6 which in turn match the wall halves 7 which are fastened in the synthetic resin housing half 3. In the embodiment shown in FIG. 3 the synthetic resin hollow structure is vibration welded, while the cross ribs 8 shown in section serve to stabilize the cantilevered wall halves 7 so as to prevent deflections of the wall halves 7 which would be harmful to the welding operation, since the direction of the welding vibration extends at right angles to the wall halves 6, 7. The wall halves 6 are bonded in the synthetic resin housing part 3 to increase the strength of the housing part by means of dome-like bulges 15. These dome-like bulges make possible the direct action of the vibration welding tool on the seam surfaces. The resonator chamber (not shown) communicates with the unseen collecting chamber of the synthetic resin hollow chamber structure by means of a connecting opening 14 which in this embodiment is in the form of a self-supporting tubular cross section which is formed by the synthetic resin housing halves 1 and 3 after the welding. In the synthetic resin hollow chamber structure stiffening ribs 24 are arranged to increase strength.

What is claimed is:

1. An air intake filter for an internal combustion engine having sound damping at least before or after a filter, comprising: an assembled hollow chamber structure having an inlet and an outlet, said hollow chamber structure comprising at least two housing parts each having a sealing surface matching a corresponding sealing surface on the other housing part, each housing part further having at least one half wall, wherein the half walls of one housing part mate corresponding half walls of the other housing part to form a resonator chamber lying in the housing interior, and wherein the matching sealing surfaces and the mating wall halves are joined to each other by means of a friction force, and wherein said inlet, said resonator chamber and said outlet communicate with each other, and a filter element, wherein said hollow chamber structure comprises a resonator chamber for damping noise, the air intake filter further comprising an air filter housing containing the filter, the air filter housing being releasably fastened to one of the housing parts, wherein a gasket of the filter is in sealing contact with a filter sealing surface of the one of the housing parts, and the filter is disposed in a flow path between the inlet and outlet.

2. An air intake filter according to claim 1, wherein at least one half wall of a housing part comprises a bulge of the housing part wall which extends into the housing interior, the bulge being operatively associated with the at least one half wall and the corresponding sealing surface to increase the stiffness of the sealing surface.

3. An air intake filter according to claim 1, wherein the at least one half wall of one housing part comprises a housing wall cross member extending into the housing interior, the cross member being operatively associated with the at least one half wall and the corresponding sealing surface to increase the stiffness of the sealing surface.

4. An air intake filter according to claim 3, wherein at least one housing wall cross member has at least one cross rib.

5. An air intake filter according to claim 4, wherein the housing parts are joined by friction welding produced by vibration in a welding vibration direction, and the half walls are oriented substantially transversely to the welding vibration direction.

6. The air intake filter according to claim 2,
wherein the bulge increases the stiffness of the sealing surface in a direction perpendicular to the half wall.

7. The air intake filter according to claim 2,
wherein the bulge is connected to the at least one half wall in an area near the corresponding sealing surface to increase the stiffness of the sealing surface in a direction perpendicular to the half wall.

8. The air intake filter according to claim 3,
wherein the cross member increases the stiffness of the sealing surface in a direction perpendicular to the half wall.

9. The air intake filter according to claim 3,
wherein the cross member is connected to the at least one half wall in an area near the corresponding sealing surface to increase the stiffness of the sealing surface in a direction perpendicular to the half wall.

10. The air intake filter according to claim 9,
wherein the cross member is connected to the at least one half wall at a right angle.

* * * * *